United States Patent
Kesiraju et al.

(10) Patent No.: US 10,970,077 B2
(45) Date of Patent: Apr. 6, 2021

(54) PROCESSOR WITH MULTIPLE LOAD QUEUES INCLUDING A QUEUE TO MANAGE ORDERING AND A QUEUE TO MANAGE REPLAY

(71) Applicant: Apple Inc., Cupertino, CA (US)

(72) Inventors: Aditya Kesiraju, San Jose, CA (US); Mridul Agarawal, Sunnyvale, CA (US); Nikhil Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 16/437,739

(22) Filed: Jun. 11, 2019

(65) Prior Publication Data

US 2020/0394039 A1 Dec. 17, 2020

(51) Int. Cl.
*G06F 9/38* (2018.01)

(52) U.S. Cl.
CPC .......... *G06F 9/3834* (2013.01); *G06F 9/3842* (2013.01); *G06F 9/3855* (2013.01); *G06F 9/3861* (2013.01); *G06F 9/3867* (2013.01)

(58) Field of Classification Search
CPC .... G06F 9/3834; G06F 9/3842; G06F 9/3861; G06F 9/3855; G06F 9/3867
See application file for complete search history.

(56) References Cited

U.S. PATENT DOCUMENTS

| | | | | |
|---|---|---|---|---|
| 6,393,536 B1 * | 5/2002 | Hughes | ................. | G06F 9/3834 711/118 |
| 6,484,254 B1 * | 11/2002 | Chowdhury | .......... | G06F 9/3834 711/169 |
| 6,725,358 B1 * | 4/2004 | Moore | ................. | G06F 9/3004 712/216 |
| 7,219,349 B2 | 5/2007 | Merchant et al. | | |
| 8,713,263 B2 | 4/2014 | Bryant | | |
| 9,946,547 B2 * | 4/2018 | Yu | .......................... | G06F 9/3826 |
| 10,203,957 B2 | 2/2019 | Fei | | |
| 2003/0033511 A1 * | 2/2003 | Akkary | ................... | G06F 9/384 712/235 |
| 2007/0028078 A1 | 2/2007 | Harris et al. | | |
| 2008/0086594 A1 * | 4/2008 | Chang | ................. | G06F 9/30043 711/118 |
| 2011/0040955 A1 * | 2/2011 | Hooker | ................. | G06F 9/3861 712/225 |

(Continued)

*Primary Examiner* — David J. Huisman
(74) *Attorney, Agent, or Firm* — Kowert, Hood, Munyon, Rankin & Goetzel, P.C.; Lawrence J. Merkel

(57) ABSTRACT

In an embodiment, a processor includes a load/store unit that executes load/store operations. The load/store unit may implement a two-level load queue. One of the load queues, referred to as a load retirement queue (LRQ), may track load operations from initial execution to retirement. Ordering constraints may be enforced using the LRQ. The other load queue, referred to as a load execution queue (LEQ), may track loads from initial execution to forwarding of data. Replay may be managed by the LEQ. In an embodiment, the LEQ may be smaller than the LRQ, which may permit the management of replay while still meeting timing requirements. Additionally, the larger LRQ may permit more load operations to be pending (not retired) in the processor, widening the window for out of order execution and supporting potentially higher processor performance.

20 Claims, 12 Drawing Sheets

(56) References Cited

U.S. PATENT DOCUMENTS

2014/0325156 A1* 10/2014 Ardevol ................ G06F 9/3834
                                                        711/122
2019/0108035 A1*  4/2019 Gonzalez .................. G06F 9/24
2020/0319889 A1* 10/2020 Kalamatianos ..... G06F 9/30043

* cited by examiner

PROCESSOR WITH MULTIPLE LOAD QUEUES INCLUDING A QUEUE TO MANAGE ORDERING AND A QUEUE TO MANAGE REPLAY

BACKGROUND

Technical Field

Embodiments described herein are related to processors and, more particularly, to load operations in processors.

Description of the Related Art

Processors use load/store operations to access memory for data to be operated upon by the processors. To support high performance, processors often implement out of order execution. Load/store operations can be speculatively performed out of order, but generally must be tracked after being performed out of order to ensure that various memory ordering rules are complied with. For example, some memory models require that load/store operations to the same address occur in program order. Load/store operations to different addresses can generally occur out of order, but if intervening updates from a different source (e.g. another processor) occur, then the operations may need to be in order in some cases.

Processors generally implement a load queue and a store queue to permit out of order memory operations while tracking operations to ensure correct order has been observed when needed. Large load and store queues provide more potential for out of order execution of loads and stores. However, large queues present implementation challenges. For example, load operations can often be replayed one or more times before they successfully forward data (e.g. due to resource conflicts or detecting ordering constraints that prevent the load operations from completing during initial attempts to execute). If the load queue is large, scanning for load operations that need to be replayed may be problematic to perform within the available clock cycle time. The need to support replay can limit the size of the load queue, which can in turn limit the amount of performance that can be achieved by the processor.

SUMMARY

In an embodiment, a processor includes a load/store unit that executes load/store operations. The load/store unit may implement a two-level load queue. One of the load queues, referred to as a load retirement queue (LRQ), may track load operations from initial execution to retirement. Ordering constraints may be enforced using the LRQ. The other load queue, referred to as a load execution queue (LEQ), may track loads from initial execution to forwarding of data. Replay may be managed by the LEQ. In an embodiment, the LEQ may be smaller than the LRQ, which may permit the management of replay while still meeting timing requirements. Additionally, the larger LRQ may permit more load operations to be pending (not retired) in the processor, widening the window for out of order execution and supporting potentially higher processor performance.

BRIEF DESCRIPTION OF THE DRAWINGS

The following detailed description makes reference to the accompanying drawings, which are now briefly described.

Figure 1:
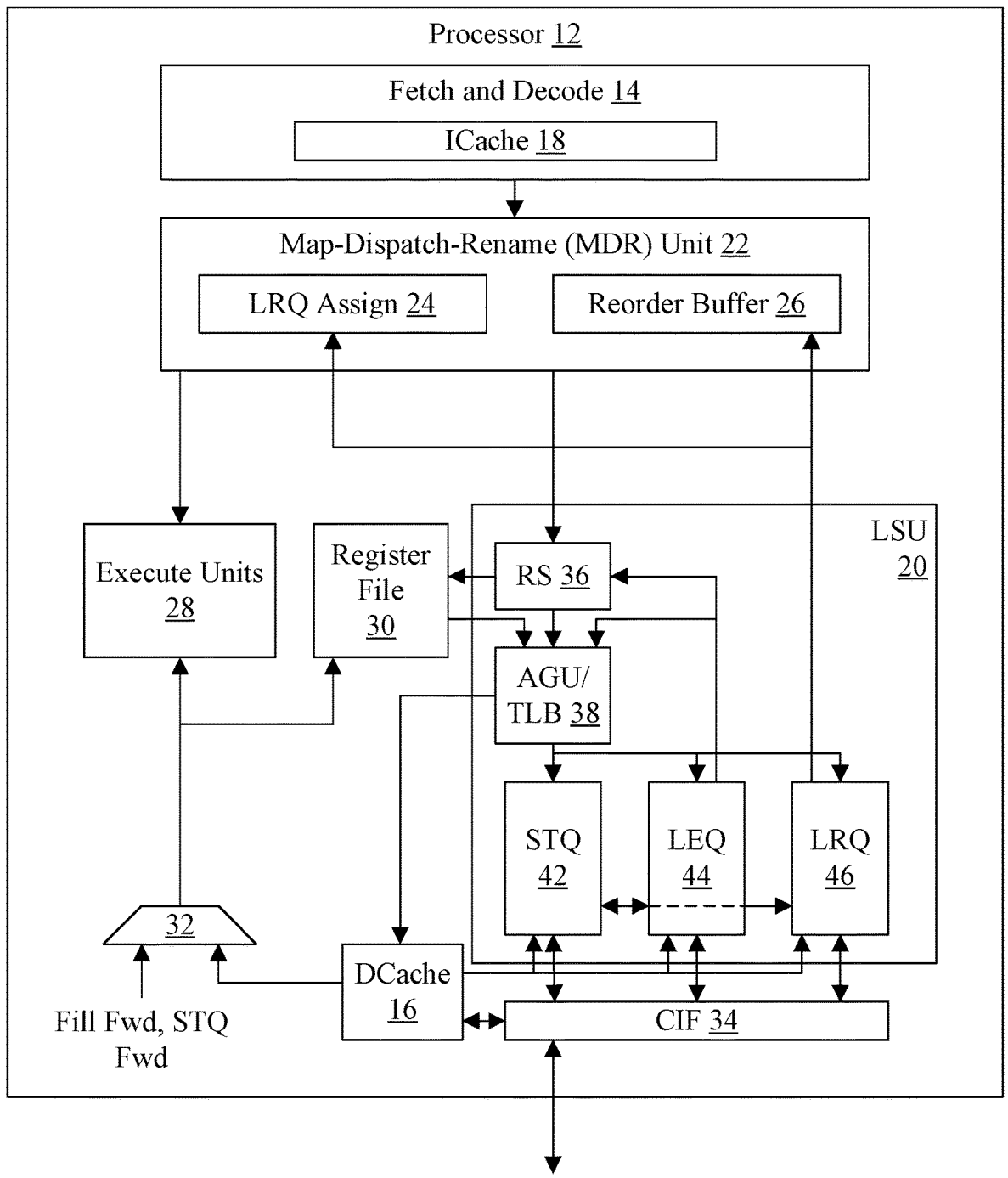
FIG. 1 is a block diagram of one embodiment of a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of a processor 12 is shown. In the illustrated embodiment, the processor 12 includes a fetch and decode unit 14 (including instruction cache, or ICache, 18), a map-dispatch-rename (MDR) unit 22 (including an LRQ assignment circuit 24 and a reorder buffer 26), one or more execute units 28, a register file 30, a data cache (DCache) 16, a load/store unit 20, and a core interface unit 34. The fetch and decode unit 14 is coupled to the MDR unit 22, which is coupled to the execute units 28 and the LSU 20. More particularly, the MDR unit 22 is coupled to a reservation station (RS) 36 in the LSU 20. The reorder buffer 26 and the LRQ assign circuit 24 are coupled to the LRQ 46 in the LSU 20. The register file 30 is coupled to the execute units 28 and the LSU 20 (and more particularly the reservation station 36 and an address generation unit/translation lookaside buffer (AGU/TLB) 38). The AGU/TLB 38 is also coupled to the DCache 16, which is coupled to the CIF 34 and to a multiplexor 32 which is coupled to the execute units 28 and the register file 30. Another input of the mux 32 is coupled to receive other data (e.g. fill forward data from the CIF 34 and/or store queue forward data from the store queue 42 (STQ 42) in the LSU 20. The DCache 16 is further coupled to the STQ 42, the LRQ 46, and the LEQ 44 in the LSU 20. The AGU/TLB 38 is coupled to the reservation station 36, the STQ 42, the LEQ 44, and the LRQ 46. The STQ 42 is coupled to the LEQ 44 and the LRQ 46, and the STQ 42, the LEQ 44, and the LRQ 46 are coupled to the CIF 34. The LEQ 44 is also coupled to the RS 36.

The fetch and decode unit 14 may be configured to fetch instructions for execution by the processor 12 and decode the instructions into ops for execution. More particularly, the fetch and decode unit 14 may be configured to cache instructions previously fetched from memory (through the CIF 34) in the ICache 18, and may be configured to fetch a speculative path of instructions for the processor 12. The fetch and decode unit 14 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The fetch and decode unit 14 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 12 may be decoded into a single instruction operation, and thus the instruction operation may be essentially synonymous with instruction (although it may be modified in form by the decoder). The term "instruction operation" may be more briefly referred to herein as "op."

The MDR unit 22 may be configured to map the ops to speculative resources (e.g. physical registers) to permit out-of-order and/or speculative execution, and may dispatch the ops to the execution units 28 and the LSU 20. The ops may be mapped to physical registers in the register file 30 from the architectural registers used in the corresponding instructions. That is, the register file 30 may implement a set of physical registers that may be greater in number than the architected registers specified by the instruction set architecture implemented by the processor 12. The MDR unit 22 may manage the mapping of the architected registers to physical registers. There may be separate physical registers for different operand types (e.g. integer, media, floating point, etc.) in an embodiment. In other embodiments, the physical registers may be shared over operand types. The MDR unit 22 may also be responsible for tracking the speculative execution and retiring ops or flushing misspeculated ops. The reorder buffer 26 may be used to track the program order of ops and manage retirement/flush.

Ops may be scheduled for execution when the source operands for the ops are ready. In the illustrated embodiment, decentralized scheduling is used for each of the execution units 28 and 20, e.g. in reservation station 36 in the LSU 20 and similar reservation stations, not shown, for other execution units 28. Other embodiments may implement a centralized scheduler if desired.

The LSU 20 may be configured to execute load/store memory ops. Generally, a memory operation (memory op) may be an instruction operation that specifies an access to memory (although the memory access may be completed in a cache such as the data cache 16). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores.

Load/store ops may be received in the reservation station 36, which may be configured to monitor the source operands of the operations to determine when they are available and then issue the operations to the AGU/TLB 38. Some source operands may be available when the operations are received in the reservation station 36, which may be indicated in the data received by the reservation station 36 from the MDR unit 22 for the corresponding operation. Other operands may become available via execution of operations by other execution units 28 or even via execution of earlier load ops. The operands may be gathered by the reservation station 36, or may be read from a register file 30 upon issue from the reservation station 36 as shown in FIG. 1.

In an embodiment, the reservation station 36 may be configured to issue load/store ops out of order (from their original order in the code sequence being executed by the processor 12, referred to as "program order") as the operands become available. To ensure that there is space in the LRQ 46 or the STQ 42 for older operations that are bypassed by younger operations in the reservation station 36, the MDR unit 22 may include circuitry that preallocates LRQ 46 or STQ 42 entries to operations transmitted to the load/store unit 20. In FIG. 1, the LRQ assign circuit 24 may be the circuitry that manages LRQ entry assignment for loads. A similar circuit may be used for allocating STQ entry assignment for stores (not shown in FIG. 1). If there is not an available LRQ entry for a load being processed in the MDR unit 22, the MDR unit 22 may stall dispatch of the load op and subsequent ops in program order until one or more LRQ entries become available. Similarly, if there is not a STQ entry available for a store, the MDR unit 22 may stall op dispatch until one or more STQ entries become available. In other embodiments, the reservation station 36 may issue operations in program order and LRQ 46/STQ 42 assignment may occur at issue from the reservation station 36.

The LRQ 46 may track loads from initial execution to retirement by the LSU 20. The LRQ 46 may be responsible for ensuring the memory ordering rules are not violated (between out of order executed loads, as well as between loads and stores). If a memory ordering violation is detected, the LRQ 46 may signal a redirect for the corresponding load. A redirect may cause the processor 12 to flush the load and subsequent ops in program order, and refetch the corresponding instructions. Speculative state for the load and subsequent ops may be discarded and the ops may be reprocessed to be executed again.

The LEQ 44, on the other hand, may track loads from initial execution to completion. A load may be complete when it has successfully forwarded data to its target register (and thus ops dependent on the load may be speculatively executed) and the load may not be replayed. Completed loads may subsequently be redirected due to memory ordering violations or other issues detected by the LRQ 46, but may not attempt to forward data again without a redirect. Most loads may forward data without replay, and thus may be completed immediately. There may be some loads, in some embodiments, which may successfully forward data and yet may not be complete. For example, certain load ops may be derived from "atomic" instructions, and may be subject to replay to verify that the access remained atomic. Other embodiments may implement atomicity in other fashions.

In an embodiment, entries in the LEQ 44 may be allocated during initial execution of load ops. The reservation station 36 may maintain credits for the LEQ 44, indicating the number of free entries, and may ensure that there is an entry available for a load op before issuing the load op. The LEQ 44 may communicate the freeing of entries to the reservation station 36 so that the reservation station 36 may update its credits as entries are freed. In an embodiment, one or more LEQ entries may be reserved for the oldest loads in the RS 36 when the LEQ 44 is approaching full, to help ensure forward progress. That is, when the number of free entries in the LEQ 44 drops to the reserved number, the RS 36 may only issue the oldest load or loads for execution. If the oldest loads are not ready for issue, the RS 36 may not issue loads for execution.

When a load/store op is issued by the reservation station 36, the AGU/TLB 38 may be configured to generate the address accessed by a load/store operation, and may be configured to translate the address from an effective or virtual address created from the address operands of the load/store operation to a physical address actually used to address memory. The AGU/TLB 38 may be configured to generate an access to the DCache 16. For load operations that hit in the DCache 16, data may be speculatively forwarded from the DCache 16 to the destination operand of the load operation (e.g. a register in the register file 30), unless the address hits a preceding operation in the STQ 42 (that is, an older store in program order) or the load is replayed. If the store data is available for forwarding on a STQ hit, the mux 32 may select data output by the STQ 42 for forwarding and the load need not be replayed due to the STQ hit. Cache misses and STQ hits where the data cannot be forwarded may be reasons for replay and the load data may not be forwarded in those cases. The cache hit/miss status from the DCache 16 may be logged in the STQ 42 or LRQ 46 for later processing.

The load operations may update the LRQ 46 entry pre-assigned to the load operations by the LRQ assign circuit 24, and the CPU store operations may update the STQ 42, to enforce ordering among operations. In one embodiment, the instruction set architecture implemented by the processor 12 may permit memory accesses to different addresses to occur out of order but may require memory accesses to the same address (or overlapping addresses, where at least one byte is accessed by both overlapping memory accesses) to occur in program order. Memory accesses will be referred to as being to the "same address" if at least one byte is accessed by both memory accesses. Thus, memory accesses to the same address may be partially overlapped (accessing some of the same bytes but also accessing one or more other bytes) or fully overlapped.

Additionally, loads may be replayed one or more times before successfully completing by forwarding data to the target register, in an embodiment. A replay occurs when a condition is detected during execution of the load, which prevents the load from forwarding data to its target location (e.g. its target register in the register file 30) but the condition may be temporary and thus re-executing the load at a later point may allow the load to successfully forward data and complete. For example, during execution, addresses of loads are compared to the stores in the STQ 42. If the load is to the same address as an older store in the STQ 42, and the data is not available for forwarding from the STQ 42, the load may be replayed so that the store data may be forwarded later (or the store may complete and the data may be available from the DCache 16). The virtual address of the load may miss in the TLB within the AGU/TLB 38, and thus the address may not be translated. The load may be replayed to obtain the translation and access the DCache 16. A load may miss in the DCache 16 and thus may be replayed to obtain the data later when the missing data is supplied to the DCache 16 in a cache fill (either as a fill forward or replaying through the DCache 16 as a cache hit after the fill). Resource conflicts may be a source of replays (e.g. a bank conflict in the DCache 16 and/or the TLB in the AGU/TLB 38 with a concurrently executing load/store op may cause the younger op to be replayed). Some loads may also require additional conditions in order to complete (e.g. they may need to be the oldest load, or may need to be non-speculative, due to the definition of the instruction from which the load is derived and/or attributes associated with the address in the translation). Accordingly, a given load may have an initial execution (issued from the reservation station 36, passing through the execution pipeline including the AGU/TLB 38 and Dcache 16 access) and, if replayed during the initial execution, one or more additional execution passes through the load pipeline initiated from the LEQ 44. That is, replay may occur again during a replay execution pass due to a different conflict than the original replay, or possibly the same conflict in some cases.

The LEQ 44 may be used to manage replays. That is, a given load op may be allocated an LEQ entry when initially executed (e.g. issued by the RS 36), and the LEQ entry may be retained to replay the load until it successfully forwards data. The LEQ entry may be freed upon successfully data forwarding/completion of the given load op. The given load op may still have an entry in the LRQ 46 after completion, however, for ordering purposes.

The LEQ 44 need not have as many entries as the LRQ 46 to support the desired performance of the processor 12. A majority of loads under ordinary circumstances do not get replayed. That is, the majority of loads are issued by the RS 36, execute, and successfully forward data on the initial execution. Thus, the majority of loads have an LEQ entry 44 for only a short time, and then the entry is freed because the load did not replay. Because the LEQ 44 may be smaller than the LRQ 46, searching the LEQ 44 for loads that are ready to be replayed may be relatively low latency (as compared to the latency than might occur if the LRQ 46 were to be searched). Thus, the replays may be lower latency that would otherwise be possible if only the LRQ 46 were used, in an embodiment. For example, replays may be at least one clock cycle lower latency than would be possible if the LRQ 46 were used, in an embodiment.

The LSU 20 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 36 may issue any number of loads up to the number of load pipes in the same clock cycle. In an embodiment, the LEQ 44 may be banked and the number of banks may be equal to the number of load pipelines. Each LEQ bank may replay load ops on a respective one of the load pipes. That is, the LEQ bank may be dedicated to the respective load pipe and may only replay its loads on the respective load pipe. In an embodiment, allocation of a given load to one of the banks may be not be restricted to which pipe initially executes the given load. That is, loads may be allocated LEQ entries in any bank, independent of the load pipe in which they initially execute. If a given load replays, however, the replays occur on the load pipe based on which bank has the entry allocated to that given load. The replay path from the LEQ 44 is illustrated as the connection of the LEQ 44 to the AGU/TLB 38, in an embodiment. There may be parallel paths for each load pipe. In an embodiment, replays take priority over loads to be issued by the reservation station 36. Accordingly, the LEQ 44 may signal the reservation station 36 when a given load pipe is being used for replay, and the reservation station 36 may stall issue on that given load pipe for that clock cycle.

The LSU 20 may also implement one or more store pipes, and in particular may implement multiple store pipes. The number of store pipes need not equal the number of load pipes, however. In an embodiment, for example, two store pipes may be used. The reservation station 36 may issue stores independently and in parallel to the store pipes.

The CIF 34 may be responsible for communicating with the rest of a system including the processor 12, on behalf of the processor 12. For example, the CIF 34 may be configured to request data for DCache 16 misses and ICache 18 misses. When the data is returned, the CIF 34 may signal the cache fill to the corresponding cache. For DCache fills, the CIF 34 may also inform the LSU 20 (and more particularly the LEQ 44 and the LRQ 46). The LEQ 44 may attempt to schedule replayed loads that are waiting on the cache fill so that the replayed loads may forward the fill data as it is provided to the DCache 16 (referred to as a fill forward operation). If the replayed load is not successfully replayed during the fill, the replayed load may subsequently be scheduled and replayed through the DCache 16 as a cache hit. The LRQ 46 may track cache hit/miss status and thus may be informed of cache fills so that the cache hit/miss status may be updated. The CIF 34 may also writeback modified cache lines that have been evicted by the DCache 16, merge store data for non-cacheable stores, etc.

The execution units 28 may include any types of execution units in various embodiments. For example, the execution units 28 may include integer, floating point, and/or media (vector) execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Media execution units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data. Media ops/execution units may more generally be vector ops/execution units.

Thus, each execution unit 28 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops.

It is noted that any number and type of execution units 28 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes. The ICache 18 and DCache 16 may each be a cache having any desired capacity, cache line size, and configuration. There may be more additional levels of cache between the DCache 16/ICache 18 and the main memory, in various embodiments At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 2:
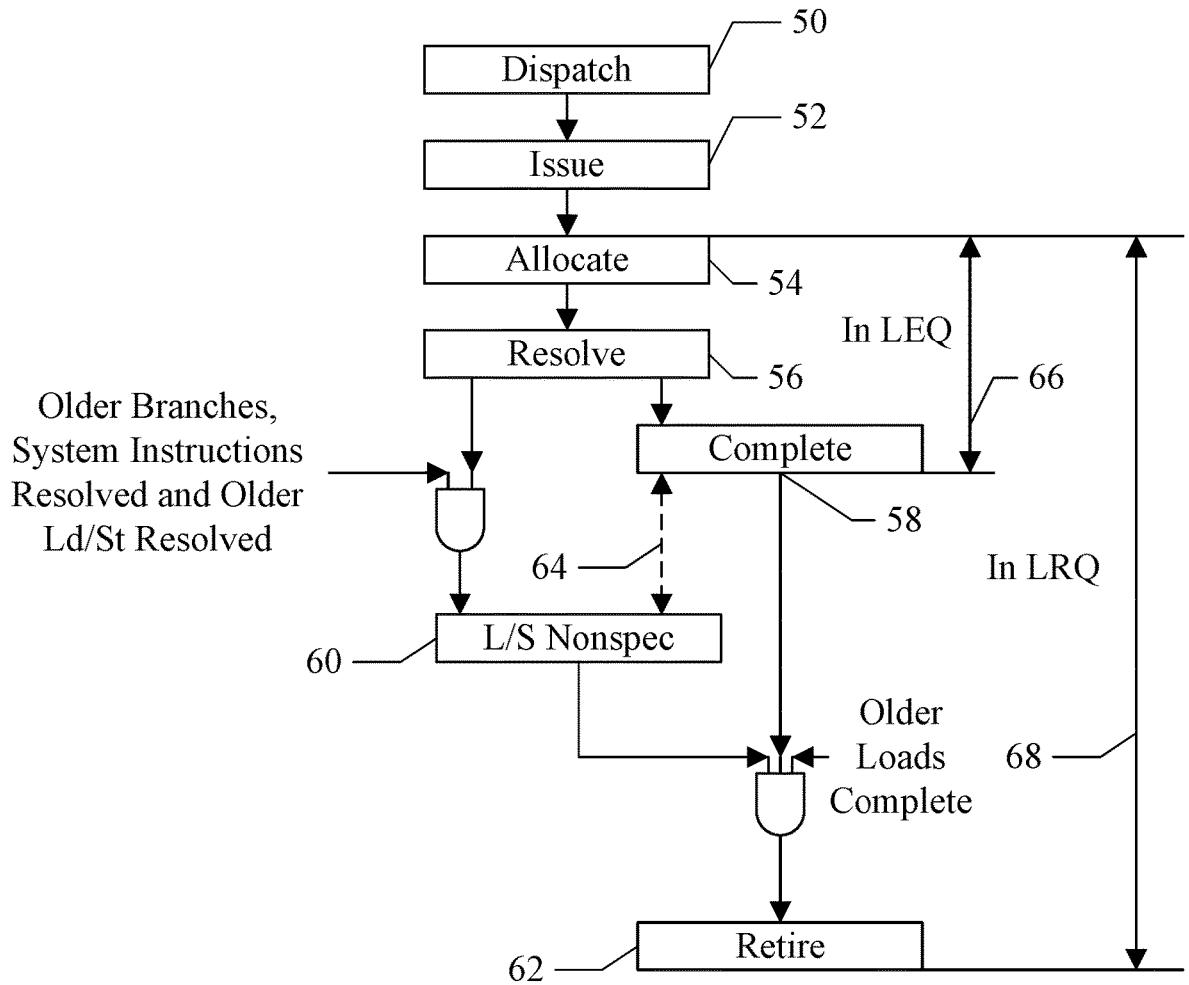
FIG. 2 is a diagram illustrating states of load operation processing in one embodiment of the processor.

FIG. 2 is a high level diagram illustrating the progress of a load through a portion of the processor 12 for one embodiment. FIG. 2 begins with the dispatch 50 of a load from the MDR unit 22 to the reservation station 36 in the LSU 20. Prior to dispatch 50, the load may be fetched and decoded in the fetch and decode unit 14. The load may wait in the reservation station 36 until its source operands are available and it is otherwise selected for issue 52 by the reservation station 36. Among other things, the issuance of the load may be subject to availability of an entry in the LEQ 44 for the load. As previously mentioned, the reservation station 36 may maintain credits indicating the number of free LEQ 44 entries. The actual allocation of a given entry may be performed by the LEQ 44 itself, as discussed in more detail below.

The load is issued 52 by the reservation station 36, and may pass through the AGU/TLB 38 and access the DCache 16. During the execution, the load is presented to the LEQ 44 and the LRQ 46, which allocate 54 the load into an entry in each queue. In the LRQ 46, the allocated entry is the entry that is preassigned to the load by the LRQ assign circuit 24. The entry number may be provided with the load through the reservation station 36 and the load pipeline to the LRQ 46. The LRQ 46 entry number may be referred to as the LNUM herein. The LEQ 44 may allocate an entry in one of the banks. In one embodiment, the LEQ 44 may attempt to allocate an entry in a bank selected based on the LNUM assigned to the load. For example, the remainder of the LNUM divided by the number of banks may be the preferred bank to assign to the load. If that bank is full, the LEQ 44 may allocate an entry in a different bank (e.g. based on bank fullness or any other criteria). Allocating banks based on the LNUM may aid the performance of streaming loads. When a streaming load is being performed, multiple consecutive loads are provided that access the same cache line. The stream may extend over multiple cache lines but several consecutive loads in the stream may access the same cache line. Since LRQ entries are allocated in program order in an embodiment, the streaming loads will have consecutive LNUMs. If the loads are successfully allocated to banks based on the LNUM, in the case of a cache miss, it is possible that fill forwarding may be performed on multiple pipes concurrently for the loads in the stream.

The load may resolve 56 once the translation is successfully completed in the AGU/TLB 38 and there is no error in the translation. If no replay conditions are detected, the load may forward data and may become complete 58. If a replay is detected, the load may be replayed one or more times from the LEQ 44 until replay is not detected and the data is forwarded, at which time the load may become complete 58.

Loads that have resolved may subsequently become non-speculative 60. A load is non-speculative if older instructions that can cause a redirect or exception (and thus flush the load) are resolved (and not causing a flush). For example, older branch instructions may be resolved as correctly predicted, thus ensuring that the load is in the code path being executed. Older system instructions or other non-load/store exception-causing instructions may also be resolved before a load is non-speculative. Similarly, older load/store ops may be resolved before the load is non-speculative. The older load ops are represented in the LRQ 46 and thus the resolution of those ops may be determined by the LRQ 46. The LRQ 46 may communicate with the STQ 42 to determine when the older store ops are resolved. It is noted that a load may become non-speculative before it completes, or vice versa, illustrated by dotted line 64 in FIG. 2. Some loads may be required to be non-speculative before they complete (e.g. waiting for non-speculative may be a replay condition for such loads). For example, some loads are addressed to a device in the system rather than memory, and the instruction set architecture may require such loads to be executed non-speculatively. In other cases, a given load may be replayed for various other reasons that prevent the load from completing prior to it being non-speculative, even if the load is not required to be non-speculative to complete.

Non-speculative loads that have completed, and for which older loads have also completed (which again may be determined by the LRQ 46 since it has entries for the older loads) may retire 62. Retiring at block 62 may refer to retiring within the LSU 20. The reorder buffer 26 may retire the same loads at different times, and may even retire a given load before the LSU 20 retires the given load. Retiring a load in the LSU 20 may refer to dequeuing the load from the LRQ 46. The retired load may no longer experience an ordering violation, and thus no longer needs to be tracked by the LRQ 46.

Once a load has reached allocation 54, data corresponding to the load is written to the LEQ 44 and the LRQ 46. Thus, the load is represented in the LEQ 44 and the LRQ 46 beginning at the allocation 54 (indicated by arrows 66 and 68, respectively). As can be seen, the load may be represented in the LEQ 44 until it completes 58, while the LRQ 46 may maintain the entry for the load through retirement.

Figure 3:
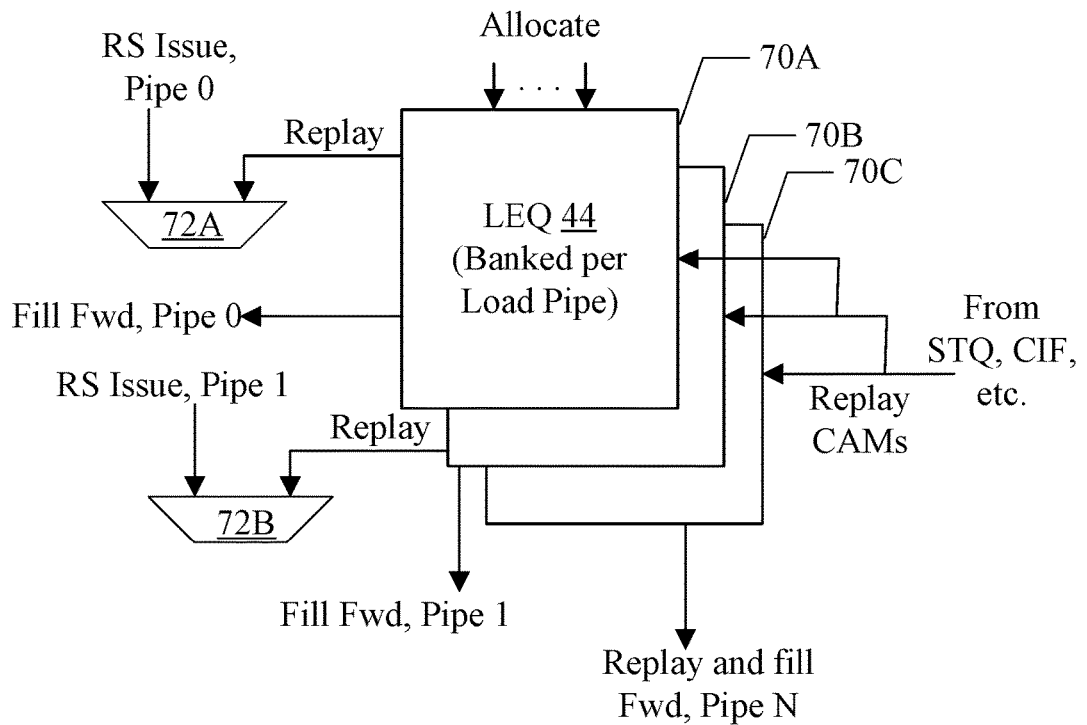
FIG. 3 is a block diagram illustrating a high-level view of a load execution queue (LEQ) and a load retirement queue (LRQ).
Figure 3:
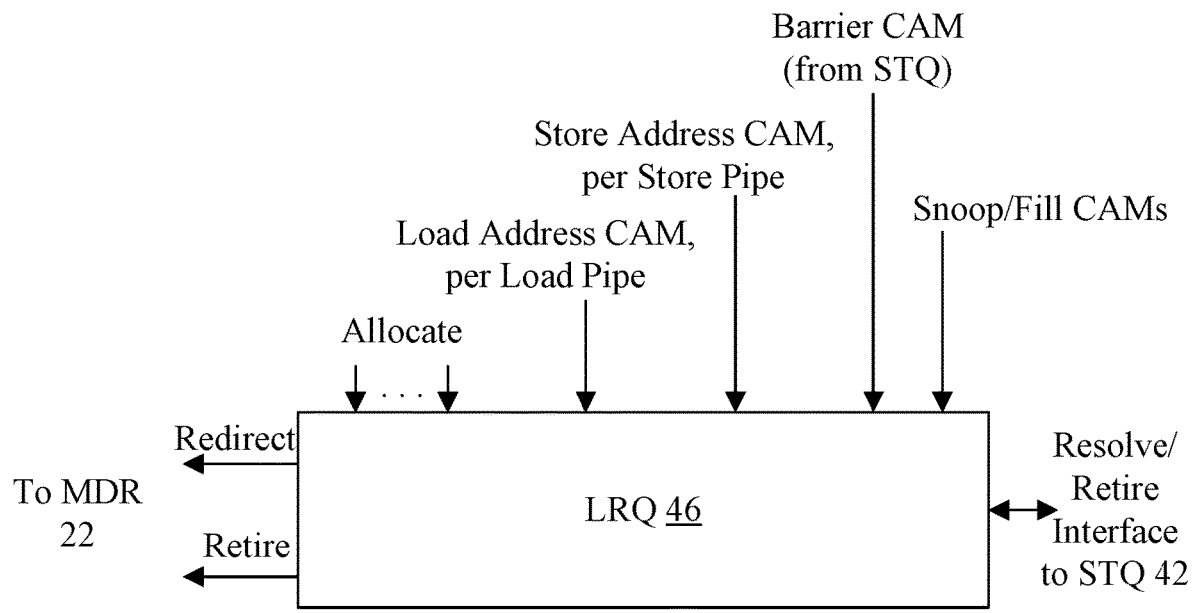

FIG. 3 is a block diagram of one embodiment of the LEQ 44 and the LRQ 46, for one embodiment, illustrating various connections to other portions of the LSU 20 and/or other portions of the processor 12.

In FIG. 3, the LEQ 44 is shown as being banked per load pipe. That is, there is a bank of LEQ 44 for each load pipe. As previously mentioned, a given bank may be dedicated to the corresponding load pipe for replays. That is, replays of loads out of the bank are performed using only the corresponding load pipe. Thus, as illustrated in FIG. 1, the bank 70A of the LEQ 44 may issue a replay on pipe 0, as illustrated by mux 72A selecting between the reservation station 36 issuance on pipe 0 or the replay from the bank 70A. Similarly, the bank 70B may issue a replay on pipe 1 (mux 72B selecting between the replay from bank 70B and the reservation station 36 issuance on pipe 1). Bank 70C may represent the last of the N banks and may replay on pipe N. Each bank 70A-70C may also be dedicated to the corresponding load pipe for performing fill forwards. The fill forward may occur at the forwarding stage of the load pipe, instead of the issue stage, illustrated via the mux 32 in FIG. 1.

As previously discussed, allocation may occur based on the LNUM and the number of banks as the preferred bank for a given load, but if allocation is not available in the preferred bank, another bank may be selected. Thus, each bank may be able to allocate up to N entries in a given clock cycle, where N is the number of pipes. The allocation inputs are illustrated at the top of bank 70A, for example.

In one embodiment, there may be at least two types of replays: immediate replays and event-based replays. Immediate replays are replays for which the corresponding load is immediately eligible to be selected for replay. The load may not be immediately selected (e.g. younger loads may be replayed before older loads, for example), but the LEQ 44 may not expressly delay the replay of the load if the replay is an immediate type. Most resource conflicts may be immediate replays, since it is unlikely that the same resource conflict would be detected again during the replay.

Event-based replays may be replays that wait for the occurrence of a specific event before attempting replay. For example, a cache miss may be an event-based replay since there is no benefit in replaying the load before the cache data will be available for forwarding. A hit on a STQ 42 entry that does not have data to forward may be an event-based replay since there is no benefit in replaying the load until the store data is provided. Loads that need to be non-speculative or the oldest outstanding load before completing may be event-based replay conditions as well, since there is no benefit in replaying the load until it is non-speculative or oldest.

Event-based replays may be tagged with a replay type and an identifier that may be supplied by the source of an event-based replay condition to indicate that the replay condition is cleared (e.g. the replay condition will not cause the corresponding load to replay). The LEQ 44 may store the replay type and identifier in a content addressable memory (CAM), and the replay sources that have event-based replays may have ports on the CAMs to signal that the replay condition has cleared. For example, the CIF 34 may provide a transaction ID for a cache fill that is performed for a cache miss as an identifier, and when the fill is scheduled to update the DCache 16, the CIF 34 may provide the transaction ID on the CAM port to indicate that loads waiting on the cache fill are now eligible for replay (either as fill forwards or as replays through the load pipe if the fill forward is not able to be scheduled for the load). Similarly, the store queue entry number of the store for which data was not available may be an identifier used to tag the event-based replay, and the STQ 42 may CAM the store queue entry numbers to clear event-based replays. Clearing an event-based replay may also be referred to as waking the corresponding load, since it may be eligible to be selected for replay when the event is cleared.

The LRQ 46 may be a single circular queue that represents loads in program order, as entries are assigned by the LRQ assignment circuit 24. The allocation ports from the load pipes may provide the data for the load (e.g. address, reorder buffer number (RNUM), the LNUM identifying the assigned entry, other data related to the load, etc.), and the allocation may involve writing the data to the assigned entry. In order to detect possible ordering violations, the address of the load may be stored in a CAM in the LRQ 46, and various CAM ports may be provided to CAM against the addresses. For example, each load pipe and each store pipe may have a CAM port. Additionally, barriers may be instructions which require ordering of memory operations that are older than the barrier before memory operations that are younger than the barrier, even if the memory operations are not to the same address. The barrier CAM may be used to detect cases in which the barrier was not respected (e.g. a younger load completed prior to the barrier).

Additionally, snoops used to maintain cache coherency may affect whether or not ordering violations are detected. Thus, there may be a snoop CAM port to detect when there is a snoop hit on a completed load. In an embodiment, the LRQ 46 tracks cache hit/miss state for loads as well, and thus there may be one or more fill CAM ports to CAM the addresses of fills being provided to the DCache 16.

The LRQ 46 may communicate with the STQ 42 to resolve and retire loads and stores (e.g. RNUMs of the youngest resolved loads and stores, and the youngest loads and stores that are ready to retire, may be exchanged to determine the resolution and retirement of loads and stores). The resolve/retire interface shown in FIG. 3 to the STQ 42 may be used for this purpose.

The LRQ 46 may communicate redirect and retire indications to the MDR unit 22 as well. The redirect indication may include the RNUM of the load for which a redirect has been detected, and may be provided to the reorder buffer 26 in the MDR unit 22. The retire indication may also include an RNUM to identify the retiring load or loads. In one embodiment, multiple loads may be retired in a clock cycle. For example, the LRQ 46 may support at least the retirement of the number of loads that may be allocated in a clock cycle (e.g. the number of load pipes), so that the LRQ 46 dequeue due to retirement may match the allocation rate. The RNUM of the retiring load may be the RNUM of the youngest of the retiring load if multiple loads are retired in a clock cycle. The retirement indication may also be provided to the LRQ assignment circuit 24, so that the LRQ assignment circuit 24 may free the corresponding LRQ entries for assignment to newly dispatched loads. The youngest LNUM may be provided, or the number of retiring loads may be provided since the retirement is performed in program order. Alternatively, the reorder buffer 26 may identify which LRQ entries have been freed due to retirement to the LRQ assignment circuit 26. Additionally, in the case of flushes due to redirects from the LSU 20 or other redirect sources (e.g. branch misprediction, system instruction exception, etc.), the reorder buffer 26 may identify flushed LRQ entries so that the LRQ assignment circuit 24 may free those entries.

Figure 4:
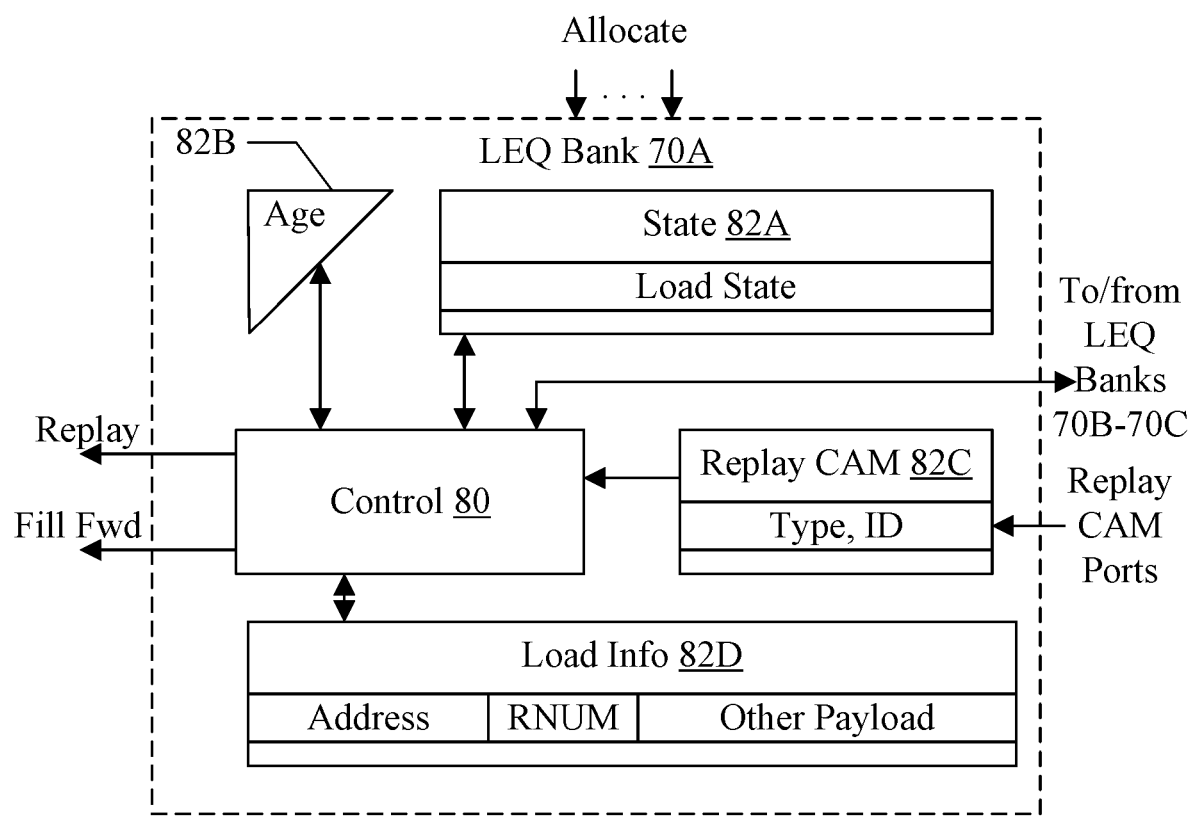
FIG. 4 is a block diagram illustrating one embodiment of the LEQ in greater detail.

FIG. 4 is a block diagram illustrating the bank 70A of the LEQ 44 in greater detail for one embodiment. Other banks 70B-70C may be similar. The LEQ bank 70A may include a control circuit 80 and various memories 82A-82D coupled to the control circuit 80. More particularly, the memory 82A may be a state memory storing various state for each load; the memory 82B may be an age memory storing age data indicating age among the loads; the memory 82C may be a content addressable memory (CAM) storing replay type and ID for each load that has been replayed with an event-based replay; and the memory 82D may be load info memory storing address, RNUM, and other payload information for each load. The memories 82A-82D may include a location for each entry in the bank 70A. That is, an entry in the LEQ bank 70A may include locations in each of the memories 82A-82D. One location is illustrated in detail in each of the memories 82A and 82C-82D in FIG. 4. The combination of locations in the memories 82A-82D may form the entry for the corresponding load. When allocation occurs during execution of the load, the locations in the memories 82A-82D may be initialized with data corresponding to the load. The locations may be updated as processing continues. The control circuit 80, along with similar control circuits in other banks 70B-70C, may collectively be viewed as the control circuit for the LEQ 44. That is, the control circuit for the LEQ 44 may be a plurality of control circuits in each bank, such as the control circuit 80 shown in FIG. 4.

The memory 82A may be the state of the load (e.g. the load state may track a state machine for the load in the LEQ 44). Various states in the progress of the load may be tracked in the memory 82A by the control circuit 80. The age memory 82B may indicate the relative age of the loads in different entries. That is, since the LEQ 44 entries are allocated as needed to the out of order execution of loads, the entries in the LEQ 44 may not have any ordering relationship to each other. The control circuit 80 may update the age memory 82B when an entry is allocated to a load, indicating that each other entry in the bank 70A that contains a load at the time of allocation is older than the allocating load. The age in this case is not a program order indication, but rather is the order that the loads were executed. Nevertheless, older loads as indicated by the age memory 82B may be given priority over younger loads for replay when more than one load is eligible for replay.

If a given load has an event-based replay, the replay CAM 82C may be written with the type and ID for the event being waited on. The state of the load in the memory 82A may indicate that the load is waiting on an event-based replay. The replay CAM ports may be coupled to the replay CAM 82C. When a location in the replay CAM 82C is matched by a replay CAM port, the replay CAM 82C may signal the control circuit 80, which may update the state of the corresponding load in the state memory 82A to indicate that the load is eligible for replay. In the case of a CAM hit for a fill from the CIF 34, the load may be eligible for fill forward scheduling.

As mentioned previously, some loads may wait to be the oldest load in the LEQ 44 before replaying. The banks 70A-70C (and more particularly the control circuit 80 and similar control circuits in the other banks) may communicate age information to identify the oldest load across the banks.

The load information (info) memory 82D may store the address of the load (which may be used to address the DCache 16 when replayed), the RNUM of the load, and various other payload that may be used in the load pipe during execution of the load. For example, the payload may include the physical register number that is the target of the load, the size of the load, etc. When a load is selected for replay, the control circuit 80 may read the information from the corresponding location in the load info memory 82D to transmit to the load pipe on the replay output of the bank 70A. Similarly, if the load is scheduled for fill forwarding, the control circuit 80 may read the information from the corresponding location in the load info memory 82D to transmit on the fill forward output. Not all of the information may be needed for a fill forward, in some cases (e.g. the full address may not be needed since the fill is known to be the correct cache line, but the offset with the cache line may be used to select data for forwarding).

It is noted that the memories 82A-82D may be further subdivided into separate memories as may be desired for various embodiments. For example, the memory 82D may be implemented as multiple memories storing different fields of the locations shown in FIG. 4, or even portions of the fields may be divided among different memories.

Figure 5:
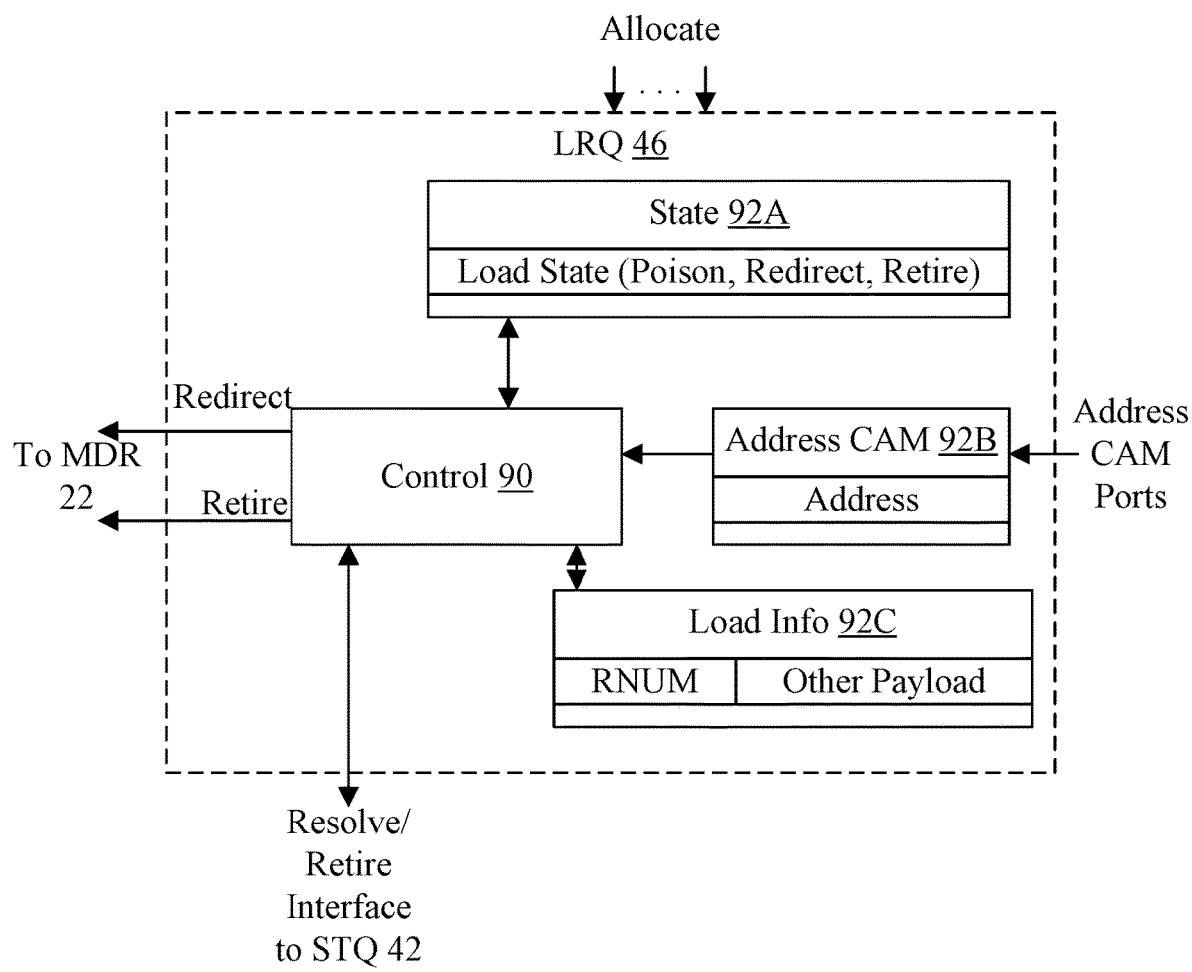
FIG. 5 is a block diagram illustrating one embodiment of the LRQ in greater detail.

FIG. 5 is a block diagram illustrating the LRQ 46 in greater detail for one embodiment. The LRQ 46 may include a control circuit 90 and various memories 92A-92C coupled to the control circuit 90. More particularly, the memory 92A may be a state memory storing various state for each load; the memory 92B may be a content addressable memory (CAM) storing address information for each load; and the memory 92C may be a load info memory storing various payload data corresponding to each load. The memories 92A-92C may include a location for each entry in the LRQ 46. That is, an entry in the LRQ 46 may include locations in each of the memories 92A-92C. One location is illustrated in detail in each of the memories 92A-92C in FIG. 5. The combination of locations in the memories 92A-92C may form the entry for the corresponding load. When allocation occurs during execution of the load, the locations in the memories 92A-92C may be initialized. The state may be updated over the life of the load in the LRQ 46 until it is flushed due to redirect or retired.

The load state field in the memory 92A may include a variety of state including whether the load is completed, cache hit/miss state, etc. Particularly, there may be state indicating if ordering violations have been detected for the load. For example, there may be a poison indication, a redirect indication, and a retire indication among the load state tracked for each load. The redirect indication may be, e.g., a bit that may be set if an ordering violation has been detected and may be clear otherwise, or vice versa. The retire indication may be a bit that be set when the load is ready to retire and no ordering violations have been previously detected for the load, and may be clear otherwise, or vice versa. The poison indication may be used when a snoop invalidate has occurred as described below. The poison bit may be a bit indicating poisoned if set and not poisoned if clear, or vice versa. Other load state may be captured in the load state field as well.

The memory 92B may store the address of the load, and may be a CAM against which the various CAM ports may be compared to detect ordering violations. That is, the CAM ports for each load pipe and store pipe, the snoop CAM port, and the fill CAM port are coupled to the memory 92B and may CAM against the memory 92B, and the memory 92B may indicate matches on the addresses to the control circuit 90 to update the state of the corresponding load in the memory 92A. In an embodiment, the address may be divided into components to simplify the CAM comparisons. For example, an upper portion of the address corresponding to the accessed page may be stored, along with a pair of indexes into the page to cache lines that are accessed by the load. A pair of indexes may be supported to permit misaligned loads that cross a cache line boundary to be performed. Other embodiments may not support misalignment and one index may be stored. The cache line offset portion of the address may be decoded into the quadword that is accessed, and a byte mask of bytes within the quadword that are accessed. In an embodiment, a pair of quadword/byte mask values may be supported to support misalignment, if desired. The CAM ports may provide the same format of address values for comparison, based on the access being performed by the source of the CAM port to the cache line.

The memory 92C may store the RNUM of the load, and various other payload data that may be used in various embodiments, if any. In an embodiment, portions of the memory 92C may be a CAM as well. For example, the RNUM may be a CAM for comparison to RNUMs that are being flushed (not shown in FIG. 5), as well as data from the STQ 42 as part of the resolve/retire interface to the STQ 42, etc.

The control circuit 90 is coupled to the resolve/retire interface with the STQ 42, and may also be coupled to the redirect and retire interfaces to the MDR 22. The control circuit 90 may control the interfaces as described above and, in more detail, below.

Figure 6:
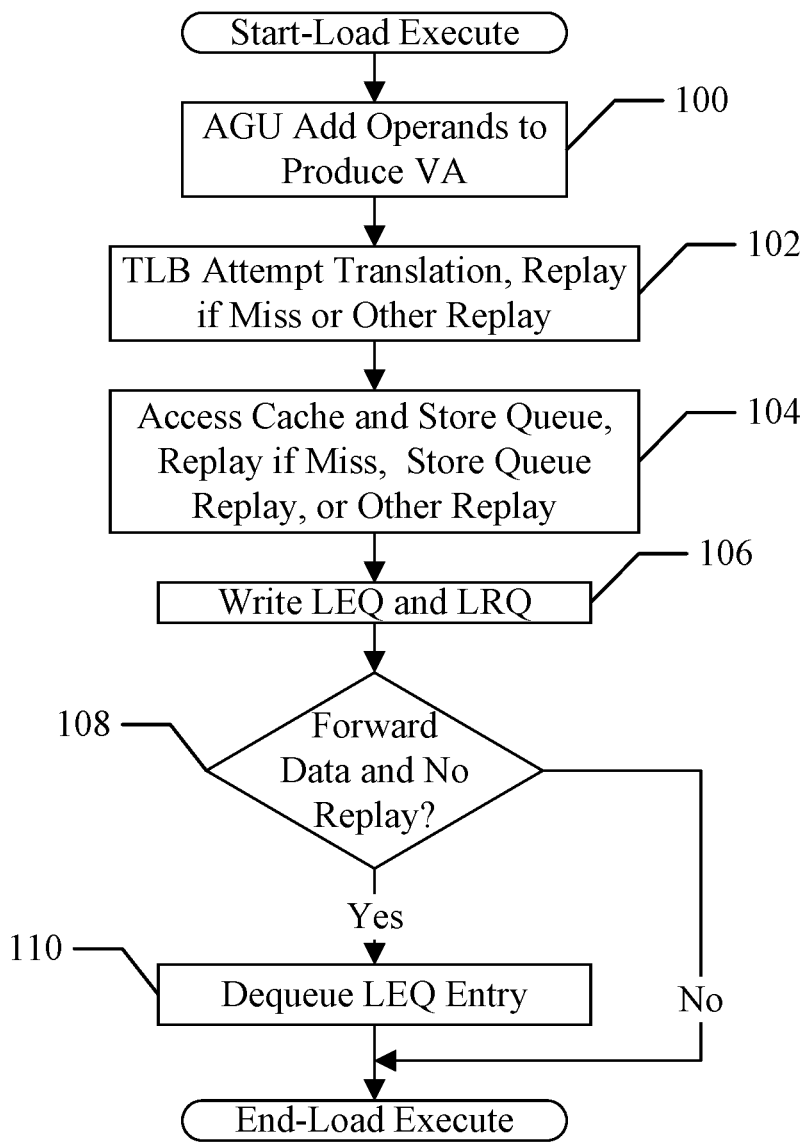
FIG. 6 is a flowchart illustrating operation of one embodiment of a load/store unit (LSU) to execute a load operation.

FIG. 6 is a flowchart illustrating operation of one embodiment of the LSU 20 to execute a load op. While the blocks are shown in a particular order for ease of understanding, other orders may be used. Blocks may be performed in parallel in combinatorial logic in the LSU 20. Blocks, combinations of blocks, and/or the flowchart as a whole may be pipeline over multiple clock cycles. The LSU 20 may be configured to implement the operation shown in FIG. 6. More particularly, the operation illustrated in FIG. 6 corresponds to issuance of a load to a load pipe from the reservation station 36. Similar operation may occur in parallel in other load pipes.

The AGU in the AGU/TLB 38 may add the operands of the load to generate a virtual address (block 100). The TLB in the AGU/TLB 38 may attempt to translate the virtual address (block 102). If the virtual address misses in the TLB, a replay may be signaled for the load. Other conditions may cause replay as well. The LSU 20 may access the DCache 16 for the load (and may CAM the STQ 42 in parallel). If the load is a miss in the DCache 16 or a hit in the STQ 42 and the STQ 42 cannot provide data, the load may be replayed. Other replay conditions may be detected as well (e.g. a bank conflict in the DCache 16 with another load/store to a different cache line, and the other load/store is older than the load) (block 104).

The LSU 20 may write the LEQ 44 and the LRQ 46 with data from the load execution (block 106). The LEQ 44 may select an entry to write the data, as discussed previously. The LRQ 46 may write the pre-assigned entry for the load. The LEQ 44 and LRQ 46 may initialize the state based on the progress of the load in the load pipe, including any detected replays, the address of the load, etc. If the load successfully forwards data to the target and there is no replay of the load (decision block 108, "yes" leg), the LSU 20 may dequeue the load from the LEQ 44 (block 110).

Figure 7:
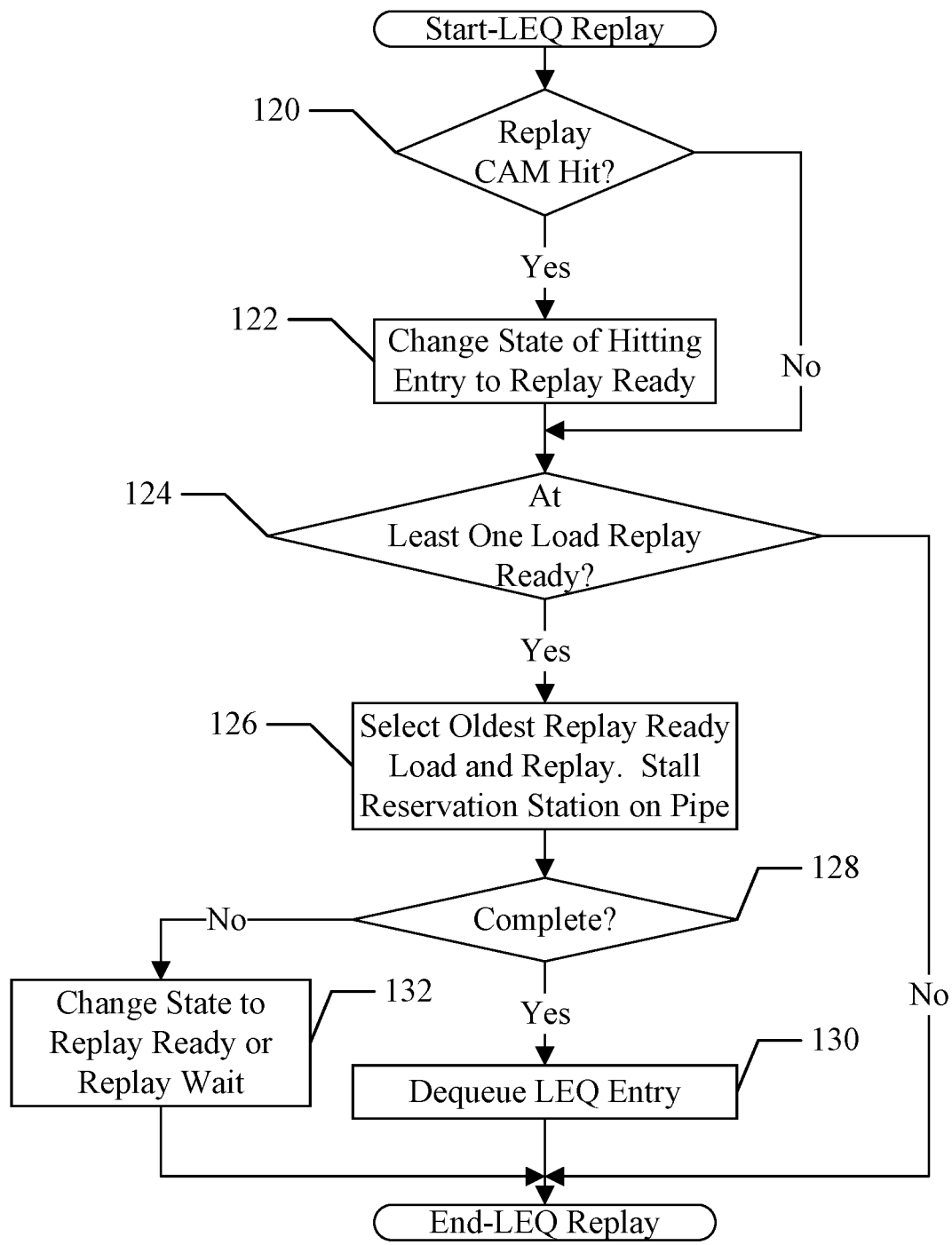
FIG. 7 is a flowchart illustrating operation of one embodiment of the LEQ to replay load operations.

FIG. 7 is a flowchart illustrating operation of one embodiment of the LEQ 44 (and more particularly the control circuit 80) to manage replays. While the blocks are shown in a particular order for ease of understanding, other orders may be used. Blocks may be performed in parallel in combinatorial logic in the LEQ 44. Blocks, combinations of blocks, and/or the flowchart as a whole may be pipeline over multiple clock cycles. The LEQ 44 may be configured to implement the operation shown in FIG. 7. More particularly, each LEQ bank 70A-70C may implement the operation of FIG. 7 in parallel on their respective load pipes, in an embodiment.

The LEQ 44 may monitor the results of the replay CAM 80C. If a replay CAM port is active and there is a replay CAM hit (decision block 120, "yes" leg), the LEQ 44 may change the state of the hitting entry from replay wait to replay ready (block 122). Entries that were replayed with an immediate replay type are initialized to replay ready when written to the LEQ 44 (or when the immediate replay condition is detected during a replay execution). It is noted that more than one CAM entry may be hit in a clock cycle (from the same CAM port or due to multiple CAM ports being active). The LEQ 44 may perform the operation of decision block 120 and block 122 for each hit. If there are no replay CAM hits (decision block 120, "no" leg), no state update may be needed.

If there is a least one load in replay ready state (decision block 124, "yes" leg), the LEQ 44 may select oldest replay-ready load in the bank and replay that load (block 126). The LEQ 44 may signal the reservation station 36 that the corresponding pipe is replaying a load and thus issuance on that pipe is stalled. If the replaying load completes, forwarding data successfully (decision block 128, "yes" leg), the LEQ 44 may dequeue the load from the LEQ entry (block 130). If the replaying load does not complete (decision block 128, "no" leg), another replay has been detected. The LEQ 44 may update the state of the LEQ entry to either replay ready (immediate replay type) or replay wait (event-based replay type) (block 132). If an event-based replay is detected, the LEQ 44 may update the replay CAM entry for the load with the new type and identifier provided from the replay source that detected the event-based replay. If there are no entries in the LEQ 44 in replay ready state (decision block 124, "no" leg), the LEQ 44 may not attempt a replay and the reservation station 36 may issue a load for execution on the load pipe.

Figure 8:
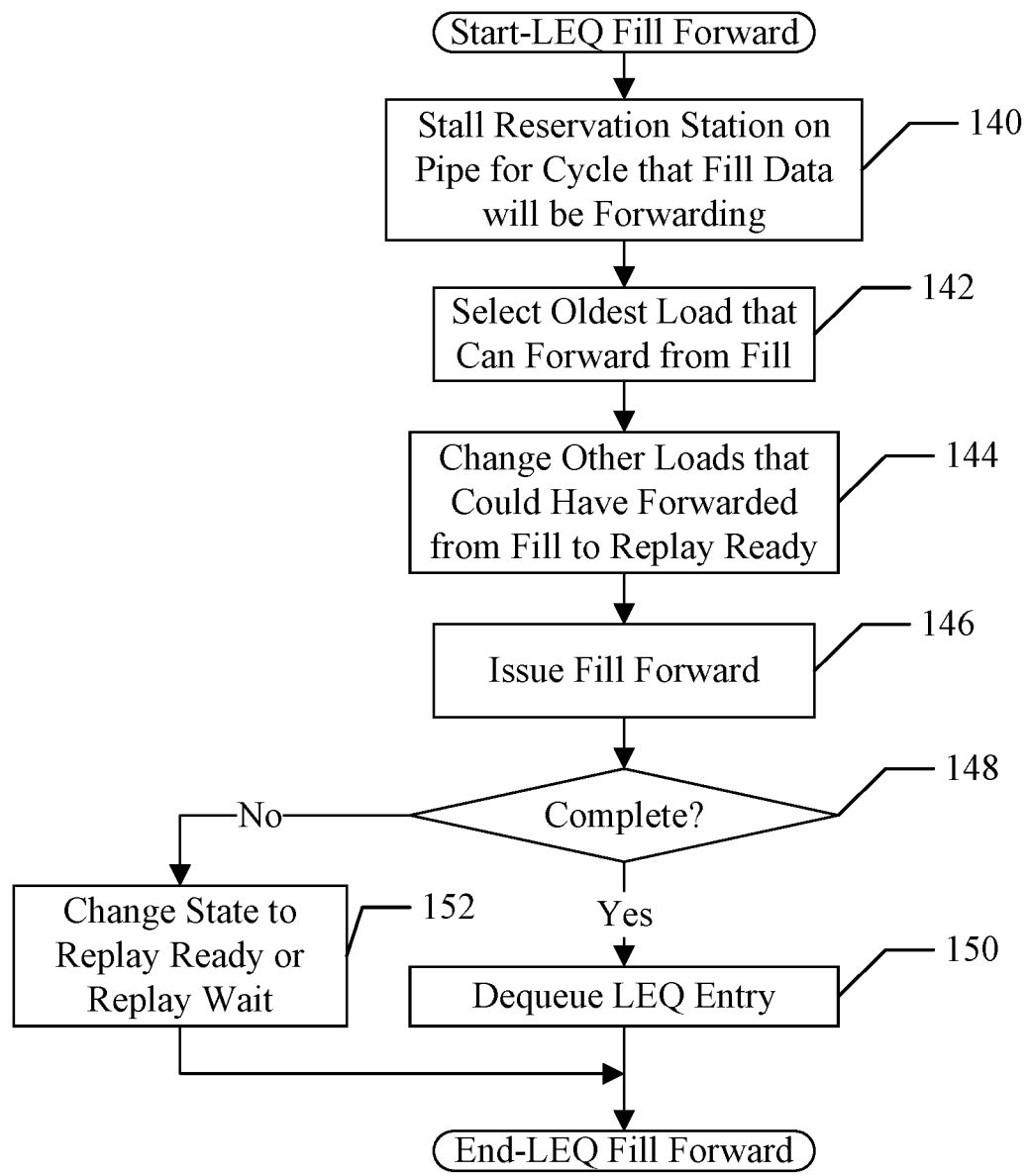
FIG. 8 is a flowchart illustrating operation of one embodiment of the LEQ to perform a fill forward for a load operation.

FIG. 8 is a flowchart illustrating operation of one embodiment of the LEQ 44 (and more particularly the control circuit 80) for fill forwarding. While the blocks are shown in a particular order for ease of understanding, other orders may be used. Blocks may be performed in parallel in combinatorial logic in the LEQ 44. Blocks, combinations of blocks, and/or the flowchart as a whole may be pipeline over multiple clock cycles. The LEQ 44 may be configured to implement the operation shown in FIG. 8. More particularly, each LEQ bank 70A-70C may implement the operation of FIG. 8 in parallel on their respective load pipes, in an embodiment.

The operation of FIG. 8 may be performed in response to a replay CAM hit from the CIF 34, indicating that a cache fill is to be written to the DCache 16. The LEQ 44 may stall the reservation station 36 for the cycle that a corresponding load would reach the forwarding stage, on each pipe for which there is a load that may forward from the fill (block 140). The identifier of the fill may be associated with more than one load in the LEQ 44, and may be associated with more than one load in a given bank 70A-70C. Each bank 70A-70C may select the oldest load (as indicated in the age memory 82B) that is eligible to forward from the fill and may schedule that load on the fill forward path (block 142). Other (younger) loads that could have forwarded from the fill that are in the same bank (if any) may not forward from the fill but replay and read the data from the DCache 16. Accordingly, the LEQ 44 may change the state of those loads to replay ready (block 144). Similarly, if the oldest load eligible to fill forward from the load may not be scheduled for the fill forward (e.g. because some conflict prevents the scheduling of the oldest load eligible to fill forward), the LEQ 44 may change the state of the oldest load to replay ready as well.

If the fill forward was successfully scheduled, the LEQ 44 may issue the fill forward to coincide with the data arriving at the DCache 16 (block 146). If the fill forward completes successfully, forwarding the data to the target register of the load (decision block 148, "yes" leg), the LEQ 44 may dequeue the load (block 150). If the fill forward did not complete successfully (e.g. due to a replay, decision block 148, "no" leg), the LEQ 44 may change the state of the corresponding entry to replay ready or replay wait, depending on the replay type that was detected (block 152).

Figure 9:
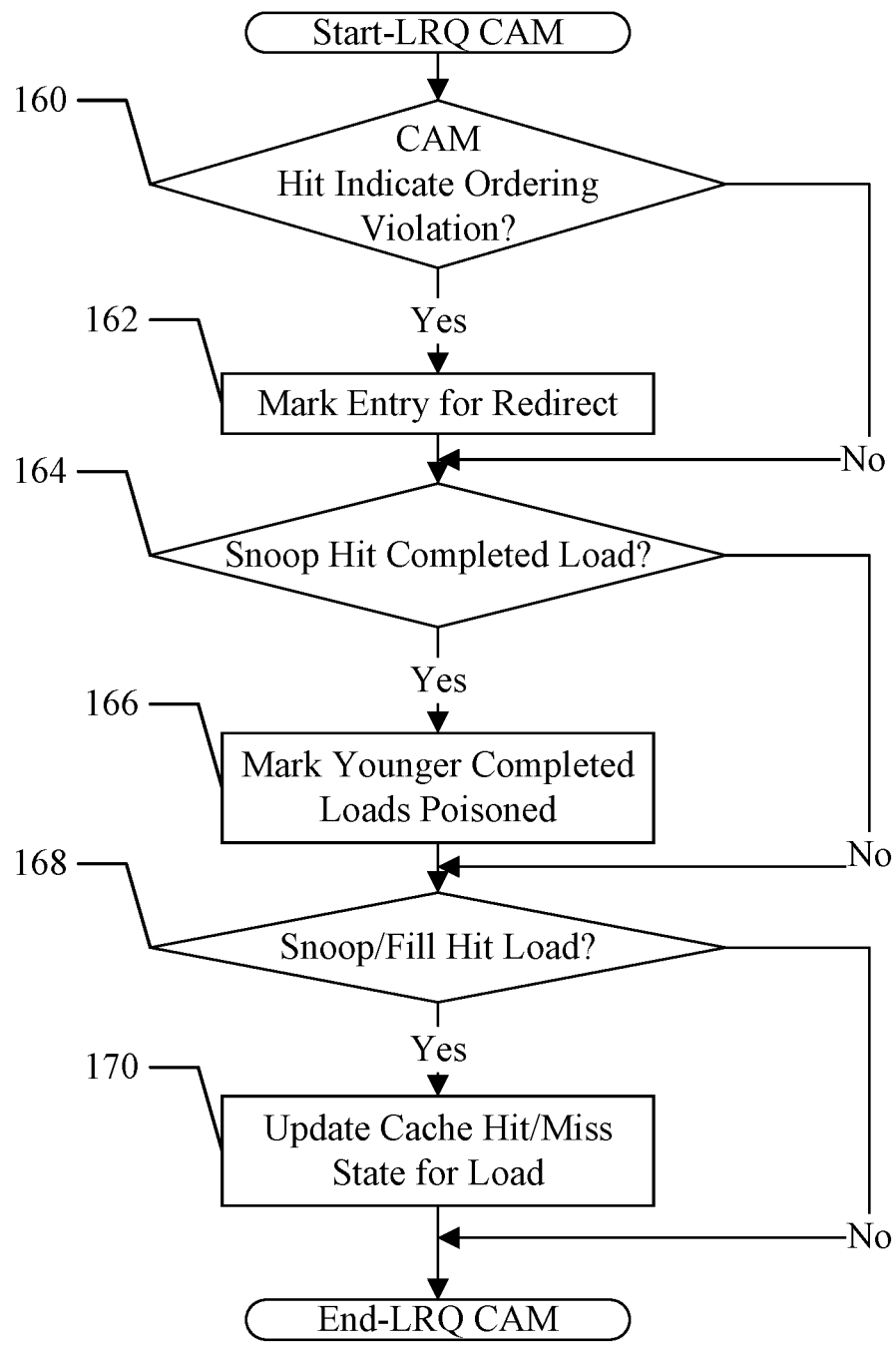
FIG. 9 is a flowchart illustrating operation of one embodiment of the LRQ for various CAM hits on the LRQ.

FIG. 9 is a flowchart illustrating operation of one embodiment of the LRQ 46 (and more particularly the control circuit 90) in response to various CAMs on the address CAM 92B. While the blocks are shown in a particular order for ease of understanding, other orders may be used. Blocks may be performed in parallel in combinatorial logic in the LRQ 46. Blocks, combinations of blocks, and/or the flowchart as a whole may be pipeline over multiple clock cycles. The LRQ 46 may be configured to implement the operation shown in FIG. 9.

The CAMs corresponding to the load/store pipes may indicate an ordering violation. For example, if one of the load pipe CAMs hits on a load in the LRQ 46 and the load in the load pipe is older than the load in the LRQ 46, an ordering violation has occurred in one embodiment of the instruction set architecture if the load in the LRQ 46 has forwarded data. If one of the store pipe CAMs hit on a load in the LRQ 46 and the store is older than the load in the LRQ 46, an ordering violation has occurred if the load has forwarded data. A CAM hit for load/store in the pipe that is younger than the load in the LRQ 46 may not be an ordering violation. If a CAM hit indicating an ordering violation is detected (decision block 160, "yes" leg), the LRQ 46 may mark the entry for redirect (block 162). That is, the LRQ 46 may update the state in the memory 92A for the load to indicate redirect. The LRQ 46 may be configured to perform the operation of blocks 160 and 162 in parallel for each CAM port and for each entry hit by the CAM port, in an embodiment.

The snoop CAM may be used to detect an invalidating snoop that hits one or more completed loads (decision block 164, "yes" leg). In an embodiment, if an invalidating snoop hit occurs on a load that has forwarded data, it is possible that younger loads which have already forwarded data (regardless of the address) could have an ordering violation with respect to memory accesses being performed by the originator of the snoop (e.g. another processor, or a coherent non-processor agent). For example, the invalidating snoop may correspond to a store by the other processor. If a preceding store to the same address as one of the younger loads was performed, the younger load may have forwarded stale data (data before the preceding store was performed). To prevent such situations, the LRQ 46 may mark the younger, completed loads as poisoned. If the younger loads attempt to retire (i.e. they do not get flushed for some other reason), the LRQ 46 may redirect on the poisoned loads instead. Accordingly, if a snoop hit on a completed load is detected (decision lock 164, "yes" leg), the LRQ 46 may scan the younger loads and mark completed loads as poisoned in their respective state in the memory 92A (block 166). If the snoop hits more than one load, the LRQ 46 may mark loads poisoned that are younger than the oldest load for which the snoop hit is detected.

The LRQ 46 may track the cache hit/miss status of each load. A snoop hit on the load may change a cache hit to a cache miss, and a cache fill hit on a load may change the state from a cache miss to a cache hit. Thus, if there is a CAM hit on a load from the snoop CAM port or a fill CAM port (decision block 168, "yes" leg), the LRQ 46 may update the cache hit/miss state for the load (block 170). The LRQ 46 may be configured to perform the operation of blocks 168 and 170 in parallel for each CAM port and for each entry hit by the CAM port, in an embodiment.

Figure 10:
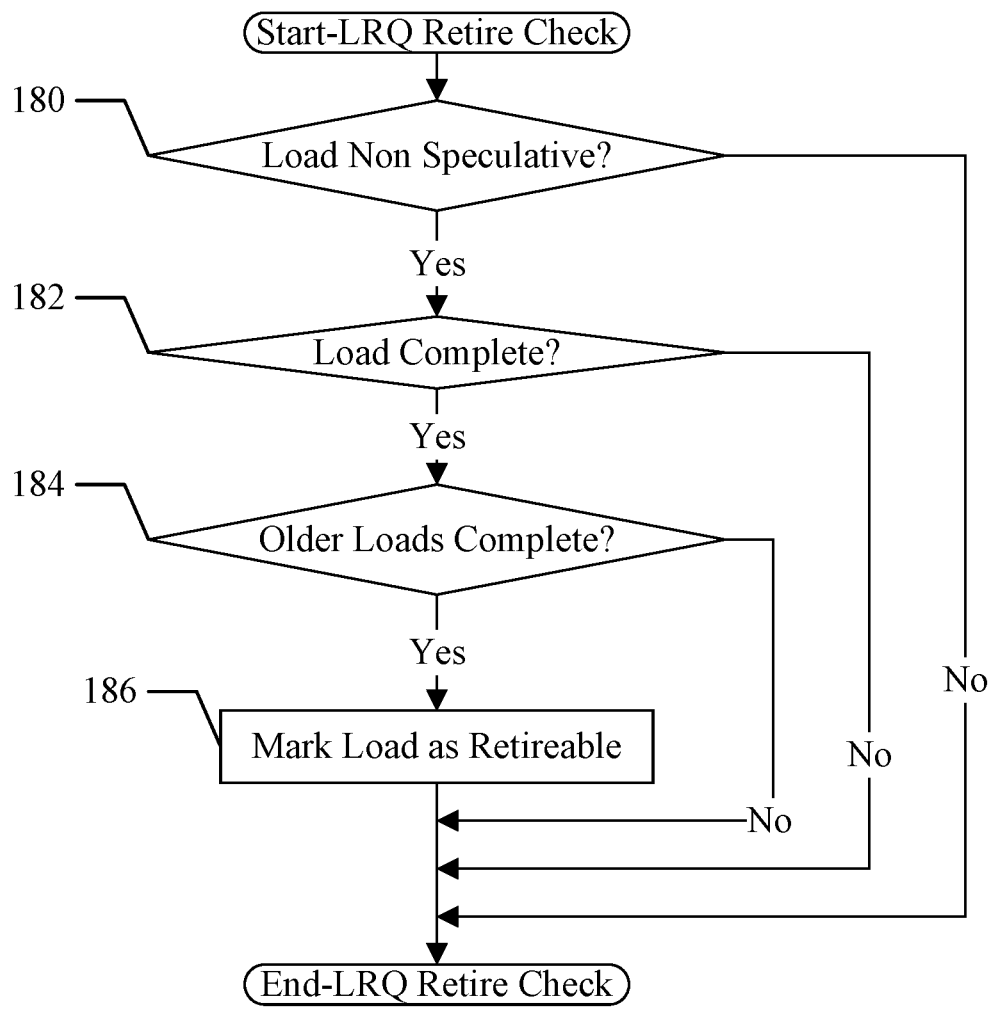
FIG. 10 is a flowchart illustrating operation of one embodiment of the LRQ to identify retireable load operations.

FIG. 10 is flowchart illustrating operation of one embodiment of the LRQ 46 (and more particularly the control circuit 90) to identify loads that are retireable. While the blocks are shown in a particular order for ease of understanding, other orders may be used. Blocks may be performed in parallel in combinatorial logic in the LRQ 46. Blocks, combinations of blocks, and/or the flowchart as a whole may be pipeline over multiple clock cycles. The LRQ 46 may be configured to implement the operation shown in FIG. 10. More particularly, the LRQ 46 may be configured to perform the operation shown in FIG. 10 in parallel on each entry in the LRQ 46.

If the load in the entry is non-speculative (decision block 180, "yes" leg), the load has completed (decision block 182, "yes" leg), and older loads in the LRQ 46 are complete (decision block 184, "yes" leg), the LRQ 46 may mark the load as retireable (block 186). Otherwise (decision blocks 180, 182, or 184, "no" leg), the load is not marked as retireable. The operation of FIG. 10 is consistent with the L/S non-speculative block 60 and complete block 58, resulting in retire block 62 in FIG. 2, for example. Note that marking a load as retireable is not the same as actually retiring the load. The load may subsequently be retired if there are no redirects on the older loads (or the load being marked as retireable), for example.

Figure 11:
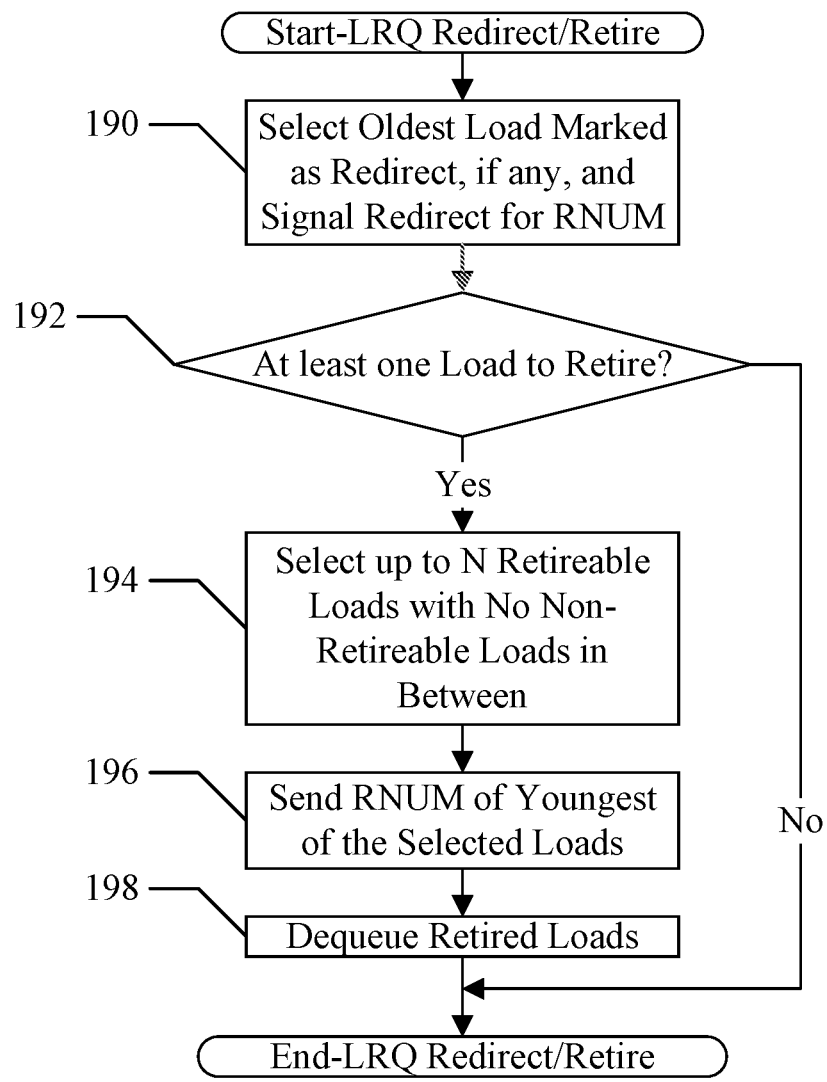
FIG. 11 is a flowchart illustrating operation of one embodiment of the LRQ to signal redirects and retirements of load operations.

FIG. 11 is a flowchart illustrating operation of one embodiment of the LRQ 46 (and more particularly the control circuit 90) to signal redirects and retirements to the MDR unit 22. While the blocks are shown in a particular order for ease of understanding, other orders may be used. Blocks may be performed in parallel in combinatorial logic in the LRQ 46. Blocks, combinations of blocks, and/or the flowchart as a whole may be pipeline over multiple clock cycles. The LRQ 46 may be configured to implement the operation shown in FIG. 11.

The LRQ 46 may select the oldest load in the LRQ 46 that is marked for redirect (if any) and may signal a redirect to the MDR 22 with the RNUM of that load (block 190). The LRQ 46 may be configured to signal the redirect once. That is, the LRQ 46 may update the state of the entry to indicate that the redirect has been signaled, in one embodiment. Subsequently, the processor 12 may flush the redirected load and younger ops, which may cause the LRQ 46 to free the corresponding entries in the LRQ 46.

The LRQ 46 may also determine if there are loads that may be retired (decision block 192). A given load may be retired if it is marked as retireable and any older loads in the LRQ 46 are also retireable. The retirement of loads may be in program order, and thus the LRQ 46 may only retire one or more loads if the oldest load is retireable. However, the LRQ 46 may attempt to retire more than one load per clock cycle. In particular, if there are N load pipes in the LSU 20 (and thus up to N loads may allocate in the LRQ 46 per clock cycle), then the LRQ 46 may be configured to retire up to N loads per clock cycle as well to match the allocation rate. Accordingly, if at least one load may be retired (e.g. the oldest load in the LRQ 46, decision block 192, "yes" leg), the LRQ 46 may select up to N retireable loads beginning with the oldest load and with no non-retireable loads in between (block 192). The retireable loads may also not be marked as redirected, so that they can be flushed with the redirect processing occurs (block 194). The LRQ 46 may select the RNUM of the youngest of the selected loads and may transmit the RNUM to the MDR 22 (and more particularly the reorder buffer 26 and the LRQ assign circuit 24) (block 196). The transmission of the RNUM may be sufficient to permit the LRQ 46 to retire the loads. That is, there may be no acknowledgement from the reorder buffer 26 for the retirement of the loads. The LRQ 46 may dequeue the retired loads (block 198). On the other hand, if there are no loads to be retired (decision block 192, "no" leg), no RNUM may be transmitted to the reorder buffer 26 and the LRQ assign circuit 24, and no loads may be dequeued.

Figure 12:
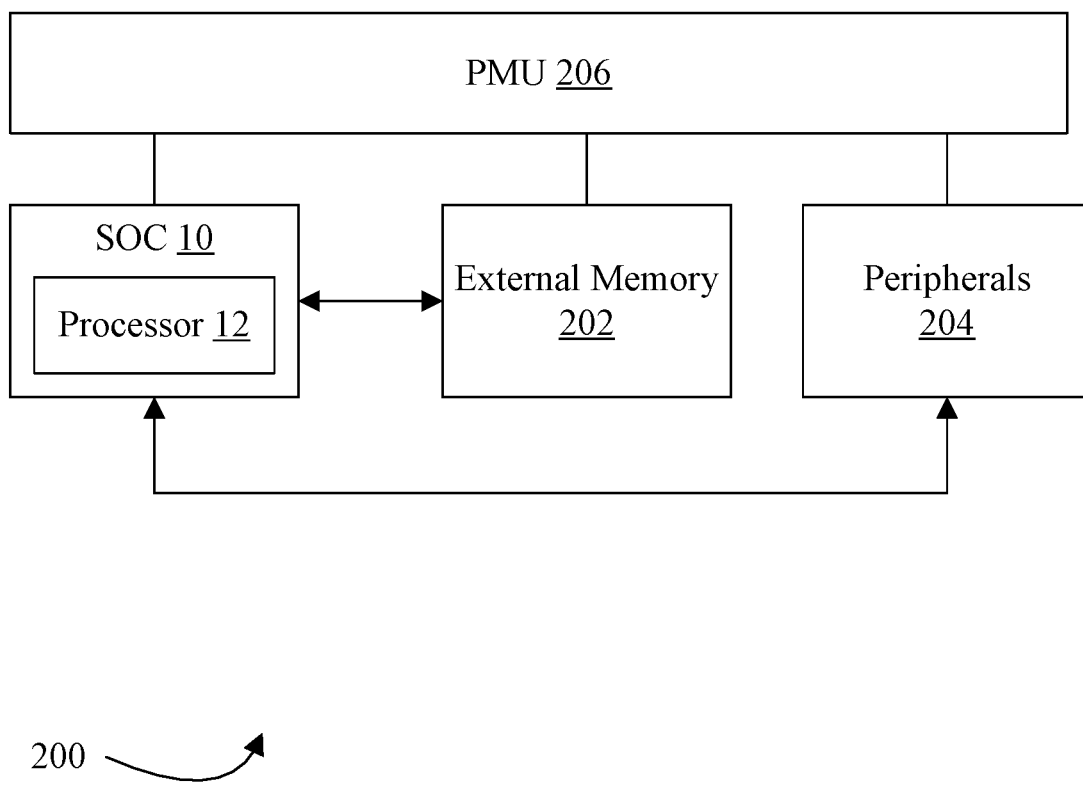
FIG. 12 is a block diagram of one embodiment of a system.

FIG. 12 is a block diagram of one embodiment of a system 200. In the illustrated embodiment, the system 200 includes at least one instance of an integrated circuit (IC) 10, which may be a system on a chip (SOC) 10 in this embodiment, coupled to one or more peripherals 204 and an external memory 202. A power supply 206 is provided which supplies the supply voltages to the SOC 10 as well as one or more supply voltages to the memory 202 and/or the peripherals 204. The SOC 10 may include one or more instances of the processor 12. In other embodiments, multiple SOCs 10 may be provided with instances of the processor 12 them.

The peripherals 204 may include any desired circuitry, depending on the type of system 200. For example, in one embodiment, the system 200 may be a computing device (e.g., personal computer, laptop computer, etc.), a mobile device (e.g., personal digital assistant (PDA), smart phone, tablet, etc.), or an application specific computing device. In various embodiments of the system 200, the peripherals 204 may include devices for various types of wireless communication, such as wifi, Bluetooth, cellular, global positioning system, etc. The peripherals 204 may also include additional storage, including RAM storage, solid state storage, or disk storage. The peripherals 204 may include user interface devices such as a display screen, including touch display screens or multitouch display screens, keyboard or other input devices, microphones, speakers, etc. In other embodiments, the system 200 may be any type of computing system (e.g. desktop personal computer, laptop, workstation, net top etc.).

The external memory 202 may include any type of memory. For example, the external memory 202 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 202 may include one or more memory modules to which the memory devices are mounted, such as single inline memory modules (SIMMs), dual inline memory modules (DIMMs), etc. Alternatively, the external memory 202 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A processor comprising a load/store unit configured to execute load/store operations, the load/store unit comprising:
   a first load queue dedicated only to loads, the first load queue including a first control circuit; and
   a second load queue dedicated only to loads, the second load queue including a second control circuit;
   wherein the first control circuit is configured to allocate a first entry in the first load queue to a first load executed by the load/store unit and the second control circuit is configured to update a second entry in the second load queue concurrent with the first control circuit allocating the first entry to the first load, wherein the second entry is allocated to the first load, and wherein the first control circuit is configured to track the first load in the first load queue until data is successfully speculatively forwarded for the first load to a target register of the first load, and wherein the second control circuit is configured to track the first load in the second load queue until the first load retires, and wherein the first control circuit is configured to replay the first load from the first load queue in response to the first load being executed but experiencing one or more conditions that prevent the first load from speculatively forwarding data, and wherein the second control circuit is configured to enforce ordering requirements on the first load in the second load queue, wherein a violation of the ordering requirements causes the processor to redirect the first load including flushing the first load and subsequent operations from the processor and refetching corresponding instructions from an instruction cache in the processor.

2. The processor as recited in claim 1 wherein the load/store unit comprises a plurality of load execution pipelines, and wherein the first load queue has a plurality of banks, and a number of banks in the plurality of banks in the first load queue is equal to a number of the plurality of load execution pipelines, and wherein the first control circuit comprises a plurality of first control circuits in the plurality of banks.

3. The processor as recited in claim 2 wherein each bank of the plurality of banks is coupled to a respective pipeline of the plurality of load execution pipelines.

4. The processor as recited in claim 3 wherein a given control circuit of the plurality of first control circuits is configured to issue replaying loads from a given bank of the plurality of banks in the respective pipeline to which the given bank is coupled.

5. The processor as recited in claim 3 further comprising a data cache coupled to the load/store unit, wherein a second load is replayed during an initial execution in response to missing in the data cache, and wherein the first load queue is configured to use the respective pipeline that is coupled to a second bank of the plurality of banks to forward fill data for the second load to a target of the second load during a cache fill of the data accessed by the second load, wherein the second load is stored in the second bank.

6. The processor as recited in claim 2 wherein the plurality of first control circuits are configured to allocate given loads to banks of the first load queue independent of which pipeline of the plurality of load execution pipelines initially executes the given loads.

7. The processor as recited in claim 1 wherein the first control circuit is configured to dequeue the first load from the first load queue responsive to successfully forwarding data for the first load, and wherein the second control circuit is configured to retain the first load in the second load queue subsequent to the successfully forwarding responsive to the first load not being ready to retire.

8. The processor as recited in claim 1 wherein the second control circuit is configured to detect an ordering violation for the first load subsequent to the first load successfully forwarding data, and the second control circuit is configured to signal a redirect on the first load in response to the ordering violation.

9. The processor as recited in claim 8 further comprising a reorder buffer coupled to receive the redirect and flush operations that are subsequent to the first load in program order.

10. The processor as recited in claim 9 wherein the reorder buffer is configured to cause the refetch of the corresponding instructions.

11. The processor as recited in claim 1 wherein the second load queue has a larger number of entries than a number of entries in the first load queue.

12. A processor comprising a load/store unit configured to execute load/store operations, the load/store unit comprising:
a first load queue dedicated only to loads; and
a second load queue dedicated only to loads;
wherein the load/store unit is configured to allocate a first entry in the first load queue to a first load executed by the load/store unit and to concurrently update a second entry in the second load queue that is assigned to the first load and wherein the load/store unit is configured to retain the first entry for the first load until data for the first load is successfully speculatively forwarded to a target of the first load and to replay the first load from the first entry based on unsuccessfully speculatively forwarding data during a previous execution of the first load, and wherein the load/store unit is configured to retain the second entry for the first load until the first load is retired to enforce ordering requirements on the first load, wherein a violation of the ordering requirements causes the processor to redirect the first load including flushing the first load and subsequent operations from the processor and refetching corresponding instructions from an instruction cache in the processor.

13. The processor as recited in claim 12 wherein the second load queue has a larger number of entries than a number of entries in the first load queue.

14. The processor as recited in claim 12 wherein the load/store unit comprises a plurality of load execution pipelines, and wherein the first load queue has a plurality of banks, and a number of banks in the plurality of banks in the first load queue is equal to a number of the plurality of load execution pipelines.

15. The processor as recited in claim 14 wherein each bank of the plurality of banks is coupled to a respective pipeline of the plurality of load execution pipelines.

16. The processor as recited in claim 15 wherein the load/store unit is configured to issue replaying loads from a given bank of the plurality of banks in the respective pipeline to which the given bank is coupled.

17. A method comprising:
issuing a first load to execute in a load/store unit;
allocating a first entry in a first load queue in the load/store unit to the first load during execution of the first load in the load/store unit and concurrently updating a second entry allocated to the first load in a second load queue in the load/store unit, wherein the first load queue and the second load queue are dedicated only to loads;
retaining the first entry for the first load until the first load successfully speculatively forwards data to a target of the first load to replay the first load from the first entry based on unsuccessfully speculatively forwarding data during a previous execution of the first load; and
retaining the second entry for the first load until the first load retires to enforce ordering requirements on the first load, wherein a violation of the ordering requirements causes a processor that includes the load/store unit to redirect the first load including flushing the first load and subsequent operations from the processor and refetching corresponding instructions from an instruction cache in the processor.

18. The method as recited in claim 17 wherein the first load queue comprises a plurality of banks equal in number to a plurality of load execution pipelines in the load/store unit, and allocating the first entry comprises allocating the first entry in a first bank of the plurality of banks independent of a first load execution pipeline of the plurality of load execution pipelines in which the first load executes.

19. The method as recited in claim 18 wherein a given bank of the plurality of banks is coupled to a respective load execution pipeline of the plurality of load execution pipelines, and the method further comprises replaying the first load from the first entry in the first bank to the respective load execution pipeline to which the first bank is coupled.

20. The method as recited in claim 19 further comprising forwarding cache fill data for a cache miss detected during initial execution of the first load during the replaying of the first load using the respective load execution pipeline to which the first bank is coupled.

* * * * *